United States Patent
Schmidt

(10) Patent No.: US 8,635,267 B2
(45) Date of Patent: Jan. 21, 2014

(54) SYSTEMS AND METHODS FOR GENERATING USER ENTERTAINMENT ACTIVITY PROFILES

(75) Inventor: Douglas Schmidt, Huntington, NY (US)

(73) Assignee: CBS Interactive Inc., San Francisco, CA (US)

( * ) Notice: Subject to any disclaimer, the term of this patent is extended or adjusted under 35 U.S.C. 154(b) by 127 days.

(21) Appl. No.: 12/895,101

(22) Filed: Sep. 30, 2010

(65) Prior Publication Data

US 2011/0225235 A1    Sep. 15, 2011

Related U.S. Application Data

(60) Provisional application No. 61/312,213, filed on Mar. 9, 2010.

(51) Int. Cl.
*G06F 15/16* (2006.01)

(52) U.S. Cl.
USPC ............................ 709/203; 709/201; 709/224

(58) Field of Classification Search
USPC ............................ 709/201, 203, 224; 715/736
See application file for complete search history.

(56) References Cited

U.S. PATENT DOCUMENTS

| | | | |
|---|---|---|---|
| 2007/0016553 A1* | 1/2007 | Dumais et al. ..................... 707/2 |
| 2008/0015878 A1* | 1/2008 | Feng et al. ......................... 705/1 |
| 2009/0144154 A1 | 6/2009 | Schein | |

FOREIGN PATENT DOCUMENTS

WO    WO 2011/112725 A1    9/2011

OTHER PUBLICATIONS

International Search Report and Written Opinion as issued in corresponding application PCT/US2011/027763, dated May 5, 2011.
International Preliminary Report on Patentability as issued in corresponding application PCT/US2011/027763, dated Sep. 20, 2012.

* cited by examiner

*Primary Examiner* — Yves Dalencourt
(74) *Attorney, Agent, or Firm* — Mahamedi Paradice Kreisman LLP

(57) ABSTRACT

Systems and methods for tracking a user's lifestyle and activity profile. This profile can be automatically updated in real time. User activity on a site is tracked. User activity from third party feeds is also received. The user activity is then combined to generate the user's total profile. A pulse engine processes the feeds, updates the profiles, creates pulse alerts, routes updates to APIs or user interfaces, and/or the like.

30 Claims, 7 Drawing Sheets

SYSTEMS AND METHODS FOR GENERATING USER ENTERTAINMENT ACTIVITY PROFILES

The present application claims benefit of priority based on U.S. Provisional Patent Application Ser. No. 61/312,213, filed Mar. 9, 2010, the disclosure of which is hereby incorporated by reference in its entirety.

BACKGROUND

1. Field of Invention

The subject invention relates to systems and methods for monitoring user activity, such as entertainment activity, and generating user activity profiles.

2. Description of Related Art

People are using the Internet to shop, socialize, play games and many other entertainment activities. For example, people have flocked to FACEBOOK™ and TWITTER™ for social networking, and many of those people are posting or tweeting their thoughts, behaviors and activities. Users, however, are often navigating from one site to the next, making it difficult to keep their friends apprised of all of their activities. However, the breadth of content and entertainment related sites, such as music streaming sites, travel sites, ticket distributors, and the like, means that much user activity, such as entertainment consumption, travel, exercise activity, purchase activity, and the like is memorialized on-line.

Some websites have started tracking popular pages or stories. For example, cnn.com has a news pulse page that ranks stories by popularity. Facebook's user home page includes a list of "top stories". These tracking features, however, only track the popularity of each individual story, and either display only those that meet a certain popularity threshold or display the stories based on a ranking of popularity.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Systems and methods for tracking a user's lifestyle and entertainment activity profile are disclosed. This profile can be automatically updated in real time. User entertainment activity on CBSi's sites (e.g., last.fm, tv.com) or any other company's in-network site may be tracked. User activity from third party feeds is also tracked (e.g., Xbox Live, Nike+, Netflix, Open Table, Twitter, Kindle, Firefox, etc.). All of the user activity is then combined, temporally, to generate the user's total entertainment/lifestyle profile. A "pulse engine" can process all of the feeds in real time, update the profiles, create pulse alerts, routes updates to APIs or user interfaces, etc. Accordingly, user entertainment activity can be monitored, processed, and shared with others in a convenient manner.

An exemplary profile that can be used with the system include a games progress tracker that records and displays user activity in a particular game (e.g., character, scores, levels, etc.). The display may be akin to a baseball card or badge of honor with the user's activities.

Another exemplary profile is metacritic. The reviews of high profile critics can be combined with buzz feeds about a reviewable asset (e.g., movies, restaurants, games, etc.). The buzz feeds are identified by tracking certain key words associated with those assets on the web (e.g., twitter, blogs, key websites, entire Internet, etc.).

An exemplary application of the profile includes an EKG of entertainment activity—a real time activity feed that is shown in a user interface (analogous to an EKG). The users entertainment activities for various sites are displayed individually and together with a combined feed representing the user's total entertainment activity. The timing of each individual user activity is tracked so that the temporal relationships/patterns in the user's individual and combined entertainment activities can be seen. Users can mouse-over or click on the feeds to learn more detailed/specific information about the user activity.

The data can be used for entertainment, data analytics, advertising, application development, competitions, recommendations engines, and the like. Also, the data may also be used to create and target custom offers, such as coupons or the like, to the user. The user activity data can also be combined with non-user activities (e.g., weather, national/world events, financial events, etc.). Non-entertainment user activity can also be tracked and combined with the user entertainment activity and/or non-user activities, such as, for example, auto data, health, travel, hobbies, location (gps), credit card/other electronic purchases, etc.

Figure 1:
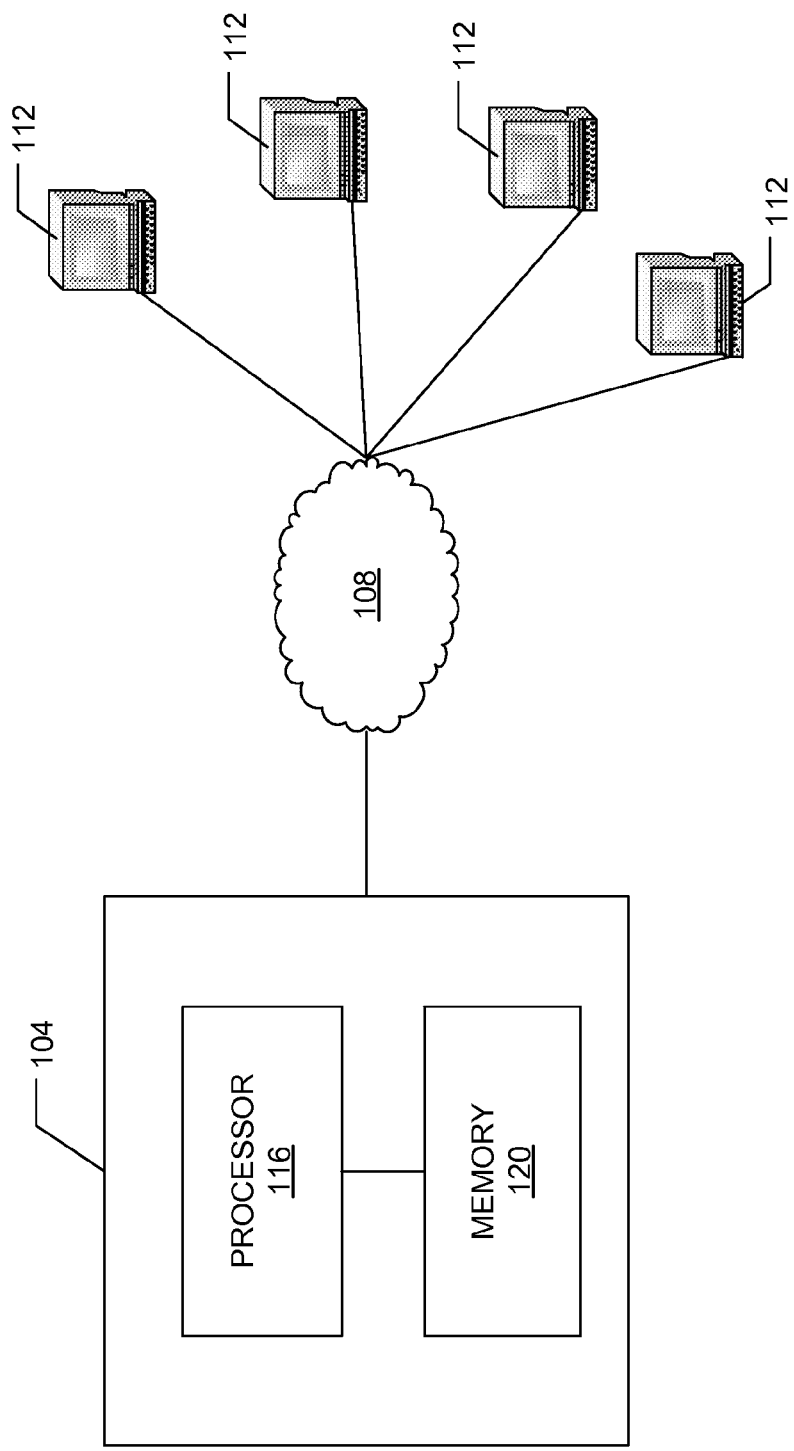
FIG. 1 is a schematic diagram of an exemplary network architecture.

An embodiment of the invention will now be described in detail with reference to FIG. 1. FIG. 1 illustrates a web-based system 100 for delivering content to a user. The system 100 includes a host site 104 and a plurality of user systems, i.e., computing devices, 112 coupled via a network 108. The system 104 includes a server 116 and memory 120.

The host site 104 is connected to the plurality of user systems 112 over the network 108. The server 116 is in communication with the memory 120. The system 104 is typically a computer system, and may be an HTTP (Hypertext Transfer Protocol) server (e.g., an Apache server). The memory 120 includes storage media, which may be volatile or non-volatile memory that includes, for example, read only memory (ROM), random access memory (RAM), magnetic disk storage media, optical storage media, flash memory devices and zip drives.

The network 108 is a local area network (LAN), wide area network (WAN), an intranet, the Internet, or combinations thereof. The plurality of user systems 112 may be mainframes, minicomputers, personal computers, laptops, personal digital assistants (PDA), cell phones, and the like. The plurality of user systems 112 are characterized in that they are capable of being connected to the network 108. The plurality of user systems 112 typically include web browsers.

When a user of one of the plurality of user systems 112 requests to access the server to view a web page, a request is communicated to the host site 104 over the network 108. For example, a signal is transmitted from one of the user systems 112, the signal having a destination address (e.g., address representing the requested page), a request (e.g., a request to view the requested page) and a return address (e.g., address representing user system that initiated the request). The request may include a cookie that includes data identifying the user and/or the user computer. The server 116 accesses the database 120 to provide the user with the requested web page, which is communicated to the user over the network 108. For example, another signal may be transmitted that includes a destination address corresponding to the return address of the client system, and a web page responsive to the request.

Figure 2:
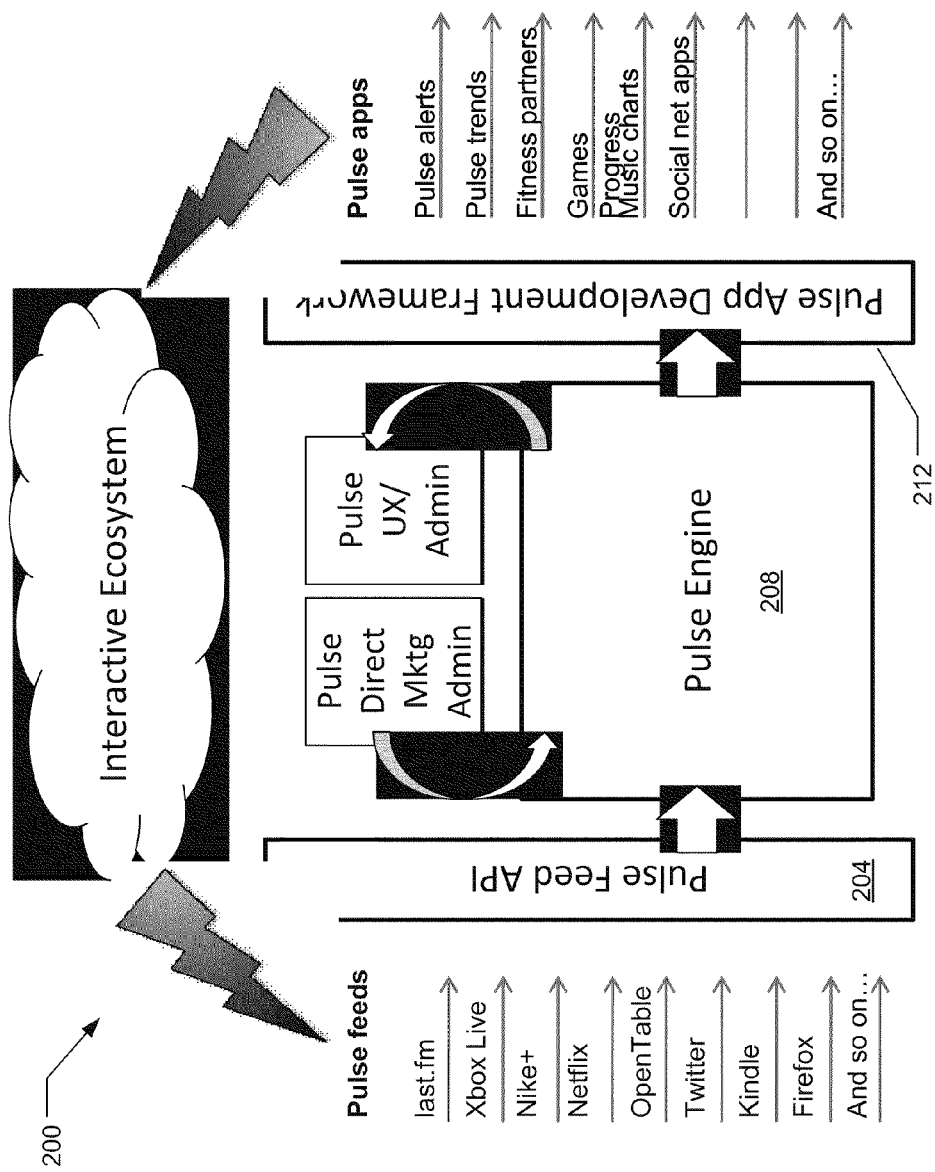
FIG. 2 is a block diagram of a system for generating a user activity entertainment profile.

FIG. 2 illustrates an exemplary computer system 200 for generating the user activity profile. The system 200 includes an API feed 204 and a pulse engine 208. The system 200 may also include an application development interface 212. Pulse direct marking administration and pulse user interface administration elements may also interact with the pulse engine 208.

It will be appreciated that the user activity in the user activity profile may be any activity, such as entertainment-related and/or a consumption website where the user does something indicating activity. Exemplary categories include movies and television, music, video games, shopping, dining, travel, exercise, concerts/live events, books and the like. For example, every time a user rents a DVD, watches a video online, watches a television show through a cable provider, listens to music, purchases music, rents a video game, downloads add-on packages, plays a demo game, purchases a product, researches a product and kicks out to purchase the researched product, reserves a table at a restaurant, buys tickets to a show or concert, buys a book or a newspaper, or makes travel plans, the user's activity may be considered for generating the user entertainment activity profile. Other types of "non-entertainment" user activity that may be tracked for the user activity profile include, for example, health data (e.g., fitness activities), hobby data (e.g., cooking, knitting), auto data (e.g., fuel efficiency), user location (e.g., GPS), and the like.

Video game play data can be used and can be collected from video game service providers such as RAPTOR™ and STEAM™.

This user activity may be in-network or out-of-network user activity. In other words, the user activity may occur on a website associated with the pulse engine that is generating the profile, or the user activity may occur on websites that are not associated with the pulse engine (third party sites). The out-of-network activity may be provided to the system 200 through the API feed 204, which receives the user activity data from a variety of third party data feeds. The API feed 204 may be an open or closed (but available) API. The data feeds include the activity data and relevant contextual information (date, time, etc.). The in-network activity may tracked in the user's profile established at that website. The data may also be obtained through an API request to a third party web site or the like.

In addition or in the alternatives, users may have access to a portable activity tracking application (e.g., on their smart phone or other portable device) that allows users to report their activities to a central database accessible by or shared with the pulse engine 208.

The pulse engine 208 then combines the user activity to generate the user activity profile. The pulse engine 208 may compile the activity data feeds, and process the data feeds in real time, and update the user profiles. The pulse engine 208 may also create pulse alerts, based on rules, and route updates and alerts via a pulse message bus. The pulse engine 208 combines or aggregates the user activity based on the contextual data provided. For example, all entertainment events that occur within a given period of time (e.g., 5 minutes, 15 minutes, hour, day, etc.) may be aggregated together for a particular user. The resulting user activity profile includes a timeline of the user activity based on the aggregation.

When the pulse engine 208 combines the user activity data it may weight one or more of the activity data types before combining the activity data (e.g., renting a movie may be weighted higher than commenting on a friend's status on facebook). The pulse engine 208 may additively combine the activity data to generate a combined activity feed for the user that is maintained with the user's profile. The pulse engine 208 may also normalize the activity data prior to combining the activity data. Activity data can be processed in any manner and the processing can be different for different users and viewers of user activity.

The pulse engine 208 may also calculate an entertainment activity score based on the user activity data and store the entertainment activity score with the personal activity profile. The pulse engine 208 may also generate a graphical user interface that shows the combined user activity alone or in combination with the individual activity feeds.

The application development interface 212 allows the user activity profile to be used in a variety of different contexts. For example, users can embed an activity monitor in their blog, website, or other social network identity (e.g., facebook profile) that displays activities as they occur. This allows other users to follow that user, do the same things as the user, read the user's comments, allow other users to put things on their list of things to do, etc. Another exemplary application is a games progress tracker that displays a user's live gaming activity. The user can show their personal "baseball card" of gaming statistics and achievements, which can be shared with other gamers or used to hold competitions.

It will be appreciated that the user activity data can be used for a variety of purposes including, for example, entertainment, data analytics, advertiser programs, innovation (e.g., power developer community of $3^{rd}$ party applications), competitions, recommendations engine, discovery of new activities, and the like.

Figure 3:
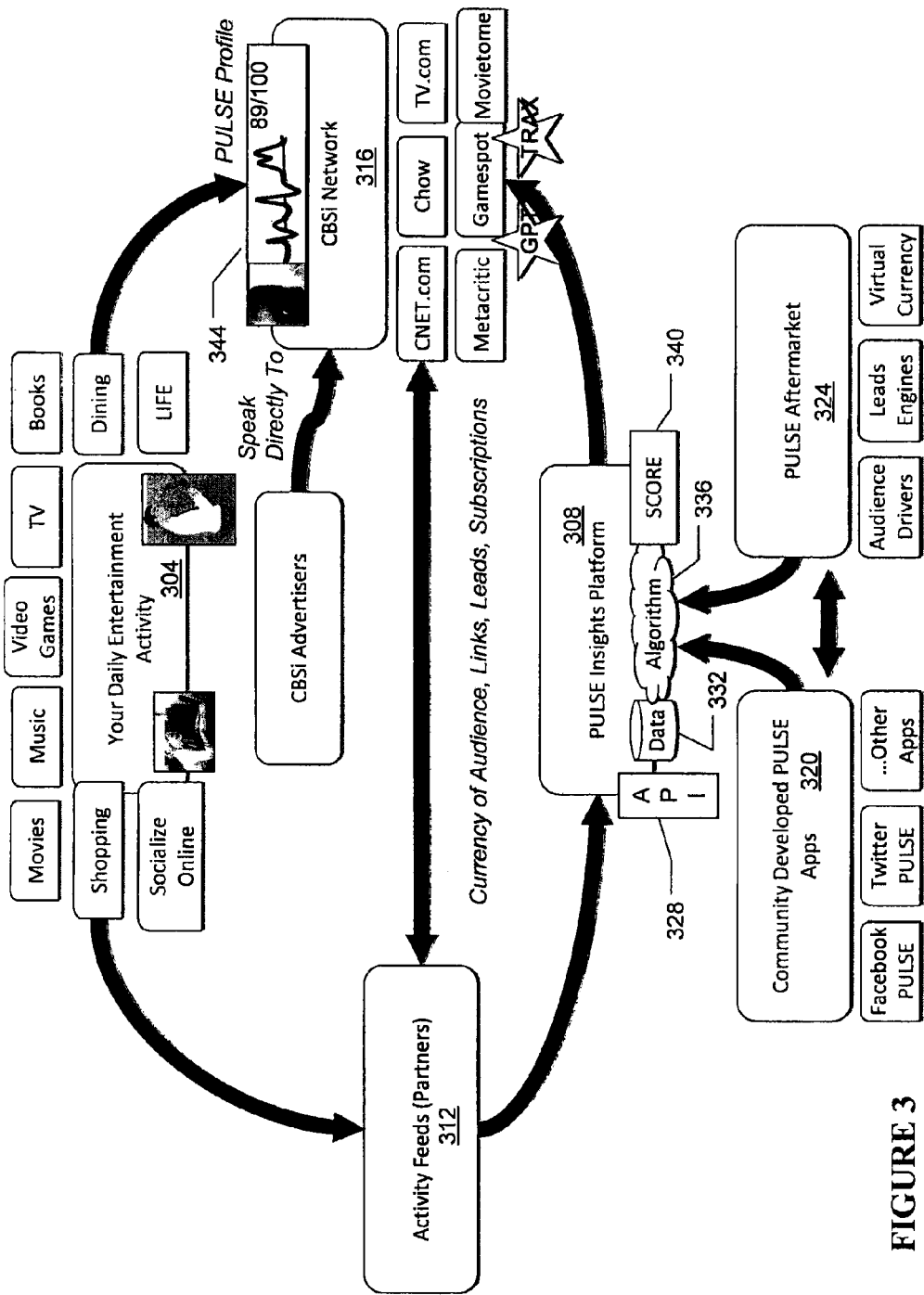
FIG. 3 is a detailed block diagram of a system for generating a user activity entertainment profile.

FIG. 3 illustrates an exemplary system 300 of data flow for generating the user activity profile according to another embodiment. As shown in FIG. 3, a user has a set of daily entertainment activity 304. The pulse insights platform 308 may receive the data from the set of daily entertainment activity 304 via activity feeds 312 or the internal network 316 (e.g., the CBSi network), and generates the user activity profile as described above with reference to the pulse engine 208 of FIG. 2. The pulse insights platform 308 may also communicate with community developed pulse applications 320 and the pulse aftermarket 324, which use the user activity profile. For example, the community developed pulse applications 320 can be used to generate a user interface for FACEBOOK™ or TWITTER™ that allows users to interact with, view and share their user activity profile. In another example, the pulse aftermarket 324 can be used to analyze the data to drive the audience to certain site assets, generate advertisement leads, virtual currency, and the like. As illustrated in FIG. 3, the pulse insights platform 308 includes an API 328, a data store 332, an algorithm 336 and a score output 340. The algorithm 336 can be used to access the user data stored in the data store 332 and accessed from the API 328 to calculate a user activity score 340 that can be used in the user activity profile 344. The entertainment activity profile or pulse profile 344 generated by the pulse insights platform 308 may also be displayed on the CBSi network 316.

Figure 4:
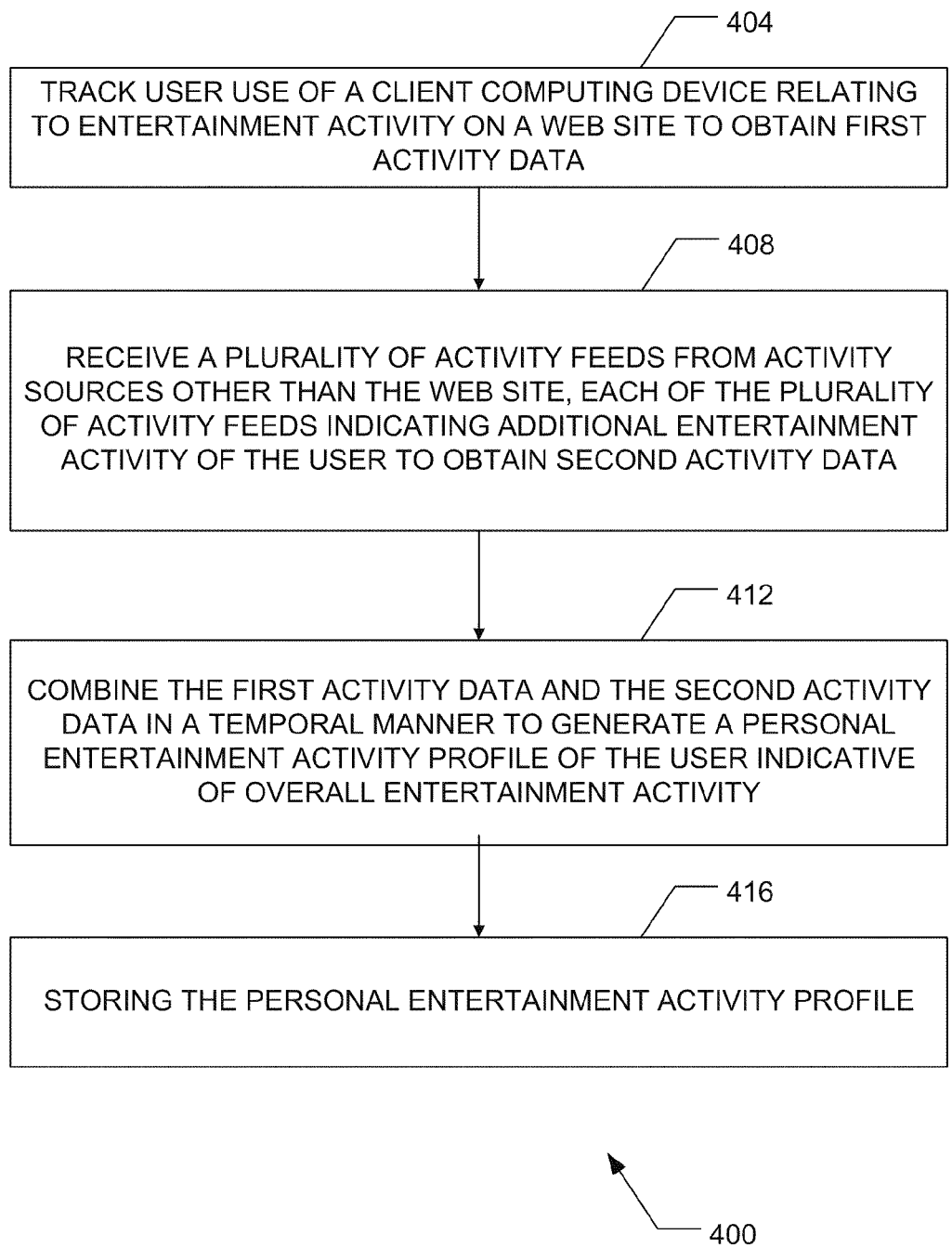
FIG. 4 is a flow diagram of a process for generating a user activity entertainment profile.

FIG. 4 illustrates an exemplary process 400 for generating an entertainment activity profile. It will be appreciated that the process 400 described below is merely exemplary and may include a fewer or greater number of steps, and that the order of at least some of the steps may vary from that described below.

As shown in FIG. 4, the process 400 begins by tracking user use of a client computing device relating to entertainment activity on a web site to obtain first activity data (block 404). The process 400 continues by receiving a plurality of activity feeds from activity sources other than the web site, each of the plurality of activity feeds indicating additional entertainment activity of the user to obtain second activity data (block 408).

The process 400 continues by combining the first activity data and the second activity data in a temporal manner to generate a personal entertainment activity profile of the user indicative of overall entertainment activity (block 412). The process 400 continues by storing the personal entertainment activity profile.

Figure 5:
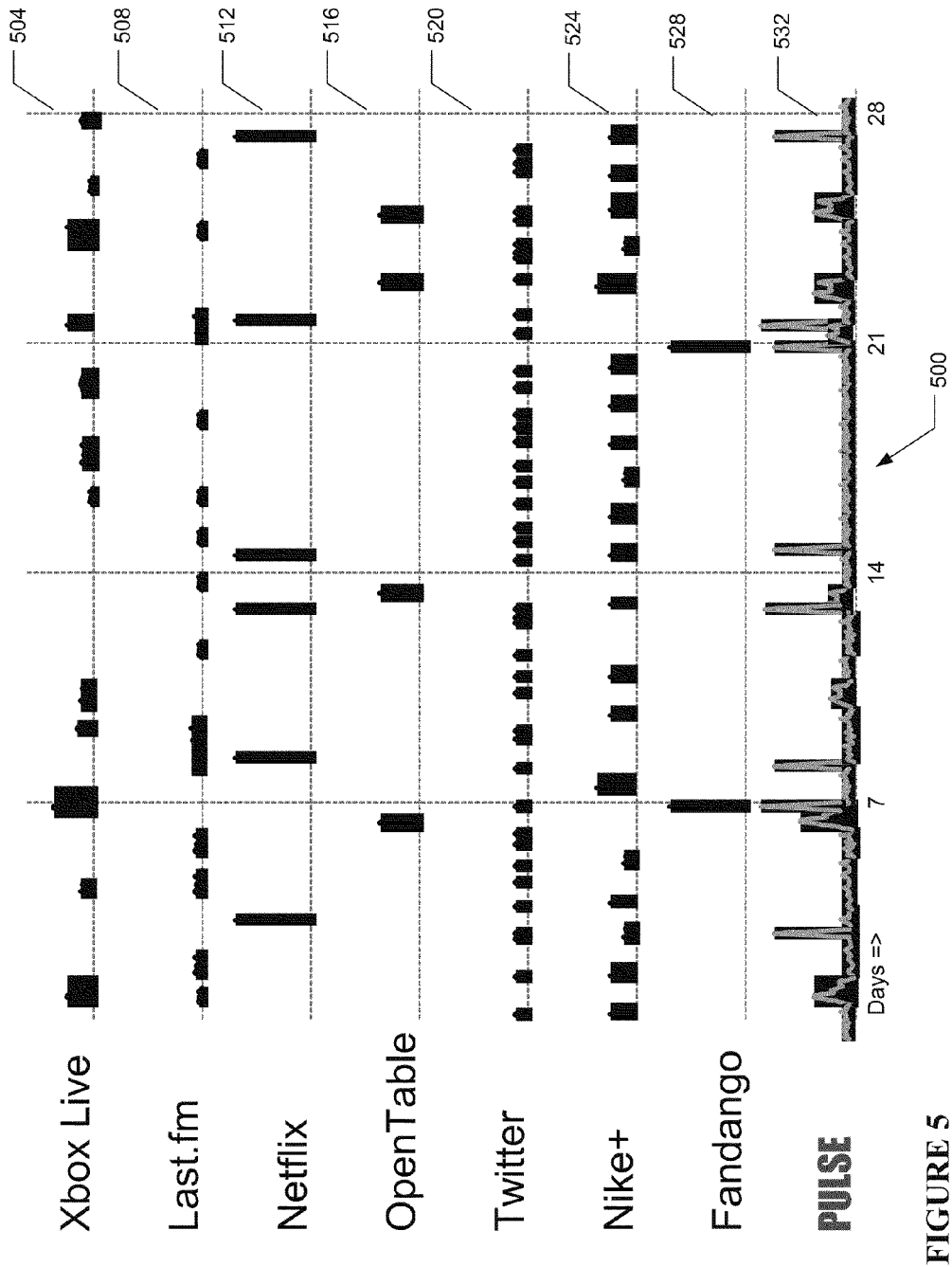
FIG. 5 is a schematic diagram of an exemplary user activity entertainment profile.

FIG. 5 illustrates an exemplary personal entertainment activity profile 500. The personal entertainment activity profile 500 includes several data feeds 508-528 and a pulse data feed 532 that is a combination of the data feeds 508-528. As shown in FIG. 5, the pulse data feed 532, includes a pulse level, which is the current steady state of the user's pulse, and pulse surges, which represent a significant change in a user's pulse.

Figure 6:
FIG. 6 is a schematic diagram of an exemplary pulse map.

FIG. 6 illustrates an exemplary metacritic user interface 600. The metacritic user interface 600 includes a metascore 604 that is calculated from a combination of movie critics and "buzz" or "hype" of the reviewed asset on the web. For example, tweets, facebook posts and/or other Internet sites (e.g., news channels, forums, etc.) can be monitored to determine whether Internet users are discussing the asset being reviewed. Other data sources that can be tracked include, for example, box office receipts, Amazon shopping cards, pre-orders/leads, restaurant reservations, etc. Although FIG. 6 illustrates a user interface for movies, it will be appreciated that the metacritic user interface 600 can be applied to cars, music, tech products, etc.

Figure 7:
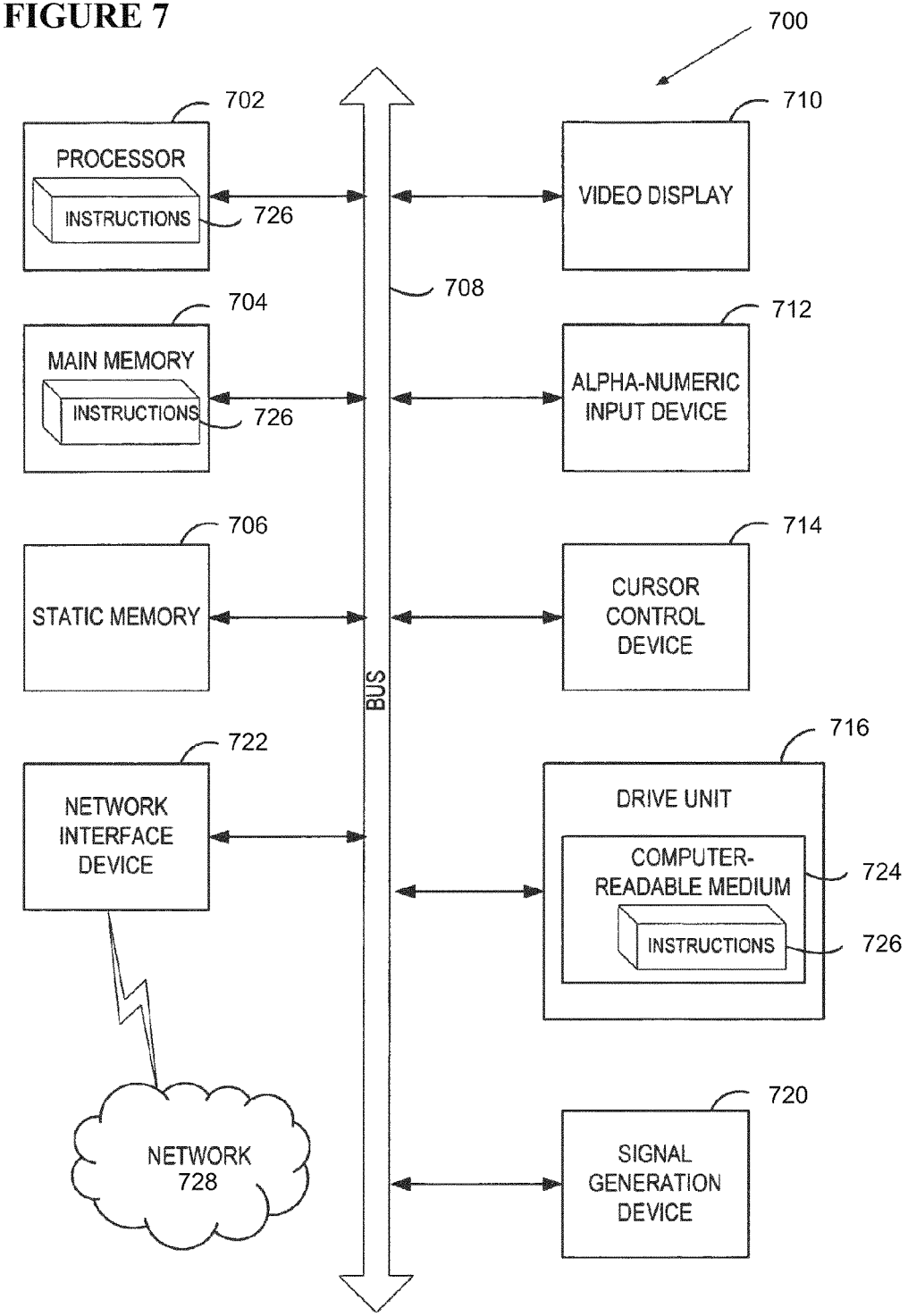
FIG. 7 is a block diagram of an exemplary computer system according to one embodiment of the invention.

FIG. 7 shows a diagrammatic representation of machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU), a graphics processing unit (GPU) or both), a main memory 704 (e.g., read only memory (ROM), flash memory, dynamic random access memory (DRAM) such as synchronous DRAM (SDRAM) or Rambus DRAM (RDRAM), etc.) and a static memory 706 (e.g., flash memory, static random access memory (SRAM), etc.), which communicate with each other via a bus 708.

The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 720 (e.g., a speaker) and a network interface device 722.

The disk drive unit 716 includes a computer-readable medium 724 on which is stored one or more sets of instructions (e.g., software 726) embodying any one or more of the methodologies or functions described herein. The software 726 may also reside, completely or at least partially, within the main memory 704 and/or within the processor 702 during execution thereof by the computer system 700, the main memory 704 and the processor 702 also constituting computer-readable media. The software 726 may further be transmitted or received over a network 728 via the network interface device 722.

While the computer-readable medium 724 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any tangible medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It should be noted that the server is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. The computer devices can be PCs, handsets, servers, PDAs or any other device or combination of devices which can carry out the disclosed functions in response to computer readable instructions recorded on media. The phrase "computer system", as used herein, therefore refers to any such device or combination of such devices. The phrase "feed" as used herein means any stream of data, including but not limited to published feeds (such as RSS feeds) and discrete data sent in response to a request.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer-implemented method comprising:
   receiving first activity data from a first source indicating user use of a client computing device relating to user activity;
   receiving a plurality of activity feeds from activity sources other than the first source, at least some of the plurality of activity feeds indicating additional user activity, to obtain second activity data; and
   combining the first activity data and the second activity data in a temporal manner to generate one or more sets of combined activity data, wherein each set of combined activity data represents an aggregate user activity occurring within a given period of time; and
   generating, a personal activity profile of the user indicative of overall personal activity.

2. The method of claim 1, wherein said receiving a plurality of activity feeds comprises sending a request for at least one activity feed and receiving at least one activity feed in response to the request.

3. The method of claim 1, further comprising analyzing the personal activity profile of the user to identify insights for the user.

4. The method of claim 1, further comprising calculating an activity score and storing the activity score with the personal activity profile.

5. The method of claim 1, further comprising generating a graphical interface to display the first activity data, the second activity data and the one or more sets of combined activity data.

6. The method of claim 1, wherein said combining step is additive.

7. The method of claim 1, wherein said combining step is non-additive.

8. The method of claim 1, further comprising normalizing the first activity data and normalizing the second activity data prior to said combining step.

9. The method of claim 8, further comprising weighting at least one of the first activity data and the second activity data prior to said combining step.

10. The method of claim 5, wherein the graphical interface includes a chart of activity versus time.

11. The method of claim 1, wherein at least some of user activity is entertainment activity.

12. A computer system comprising:
    a memory; and
    a processor coupled to the memory, the processor configured to:
       track user use of a client computing device relating to user activity on a first source to obtain first activity data,
       receive a plurality of activity feeds from activity sources other than the first source, at least some of the plurality of activity feeds indicating additional user activity, to obtain second activity data,
       combine the first activity data and the second activity data in a temporal manner to generate one or more sets of combined activity data, wherein each set of combined activity data represents an aggregate user activity occurring within a given period of time,
       generate a personal activity profile of the user indicative of overall user activity, and
       cause the personal activity profile to be stored in the memory.

13. The computer system of claim 12 wherein the processor receives a plurality of activity feeds in response to a request for the activity feeds.

14. The computer system of claim 12, wherein the processor is further configured to cause display of the personal activity profile.

15. The computer system of claim 12, wherein the processor is further configured to calculate a score quantifying the personal activity of the user and wherein the score is stored with the personal activity profile.

16. A computer system comprising:
    an application programming interface (API) for receiving a plurality of user activity feeds, at least some of the plurality of activity feeds indicating entertainment activity of the user, to obtain activity data; and
    a pulse engine for combining the activity data in a temporal manner to generate a personal entertainment activity profile of the user indicative of overall aggregate entertainment activity during each of one or more predetermined intervals of time.

17. The computer system of claim 16, further comprising a user interface for displaying the personal entertainment activity profile.

18. The computer system of claim 16, wherein the pulse engine further tracks user use of a client computing device relating to entertainment activity on a web site to obtain internal activity data and combines the internal activity data with the activity data in a temporal manner to generate the personal entertainment activity profile.

19. The computer system of claim 16, wherein the pulse engine further calculates a score quantifying the personal entertainment activity of the user and wherein the score is included in the generated personal entertainment activity profile.

20. A non-transitory computer-readable storage media having computer executable instructions stored thereon which cause a computer system to carry out a method when executed, the method comprising:
    receiving first activity data from a first source indicating user use of a client computing device relating to user activity;
    receiving a plurality of activity feeds from activity sources other than the first source, at least some of the plurality of activity feeds indicating additional user activity, to obtain second activity data; and
    combining the first activity data and the second activity data in a temporal manner to generate one or more sets of combined activity data, wherein each set of combined activity data represents an aggregate user activity occurring within a given period of time; and
    generating, a personal activity profile of the user indicative of overall personal activity.

21. The media of claim 20, wherein said receiving a plurality of activity feeds comprises sending a request for at least one activity feed and receiving at least one activity feed in response to the request.

22. The media of claim 20, further comprising analyzing the personal activity profile of the user to identify insights for the user.

23. The media of claim 20, the method further comprising calculating an activity score and storing the activity score with the personal activity profile.

24. The media of claim 20, the method further comprising generating a graphical interface to display the first activity data, the second activity data and the one or more sets of combined activity data.

25. The media of claim 20, wherein said combining step is additive.

26. The media of claim 20, wherein said combining step is non-additive.

27. The media of claim 20, the method further comprising normalizing the first activity data and normalizing the second activity data prior to said combining step.

28. The media of claim 27, the method further comprising weighting at least one of the first activity data and the second activity data prior to said combining step.

29. The media of claim 24, wherein the graphical interface includes a chart of activity versus time.

30. The media of claim 20, wherein at least some of user activity is entertainment activity.

* * * * *